June 26, 1956  M. BUONO  2,751,870
METHOD OF MAKING FELLING STITCHES
Original Filed Aug. 11, 1953  6 Sheets-Sheet 2

INVENTOR
MARIO BUONO
BY Mock + Blum
ATTORNEYS

June 26, 1956  M. BUONO  2,751,870
METHOD OF MAKING FELLING STITCHES
Original Filed Aug. 11, 1953  6 Sheets-Sheet 3

INVENTOR
MARIO BUONO
BY Mock & Blum
ATTORNEYS

June 26, 1956  M. BUONO  2,751,870
METHOD OF MAKING FELLING STITCHES
Original Filed Aug. 11, 1953  6 Sheets-Sheet 4

INVENTOR
MARIO BUONO
BY Mock & Blum
ATTORNEYS

June 26, 1956  M. BUONO  2,751,870
METHOD OF MAKING FELLING STITCHES
Original Filed Aug. 11, 1953  6 Sheets-Sheet 5
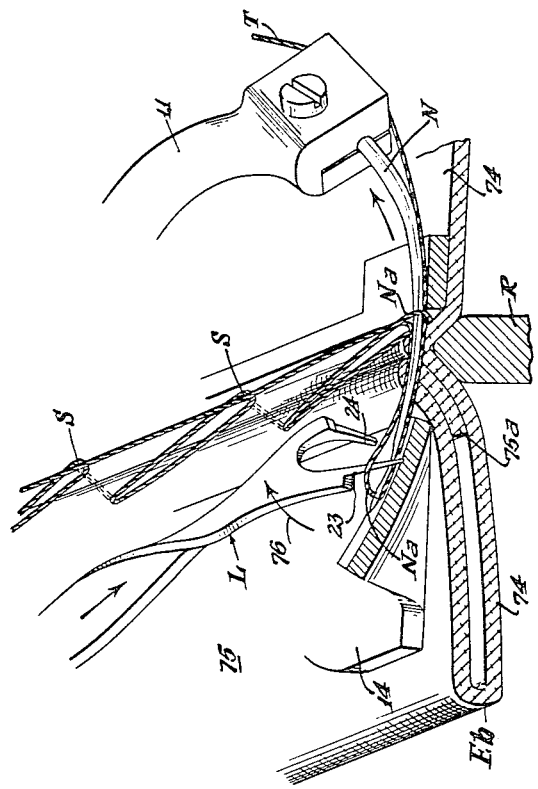
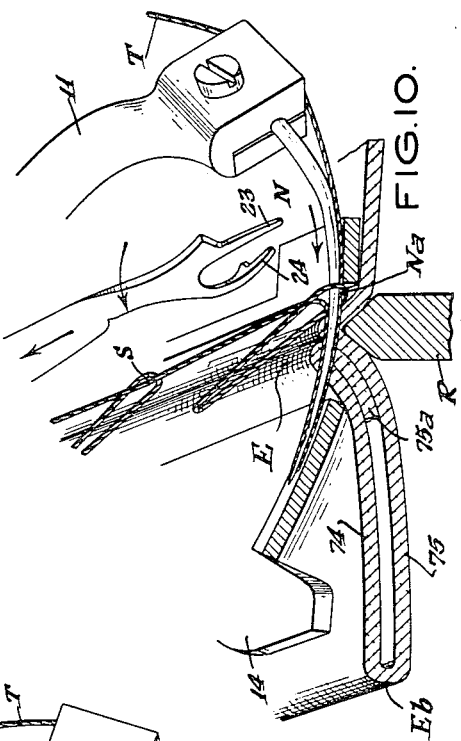
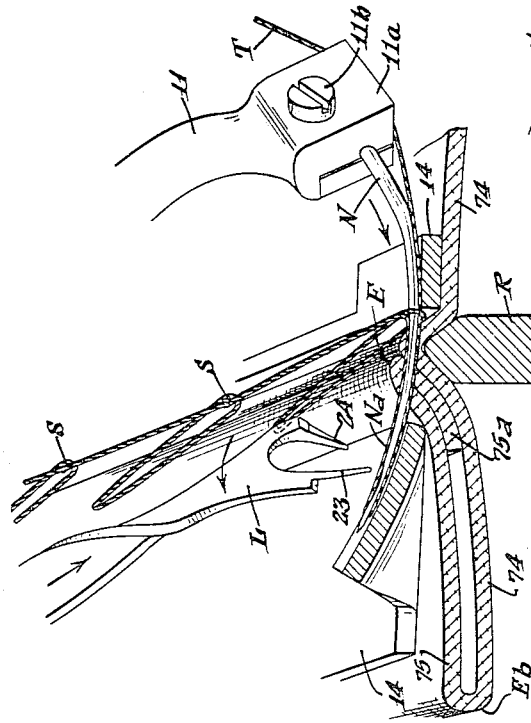
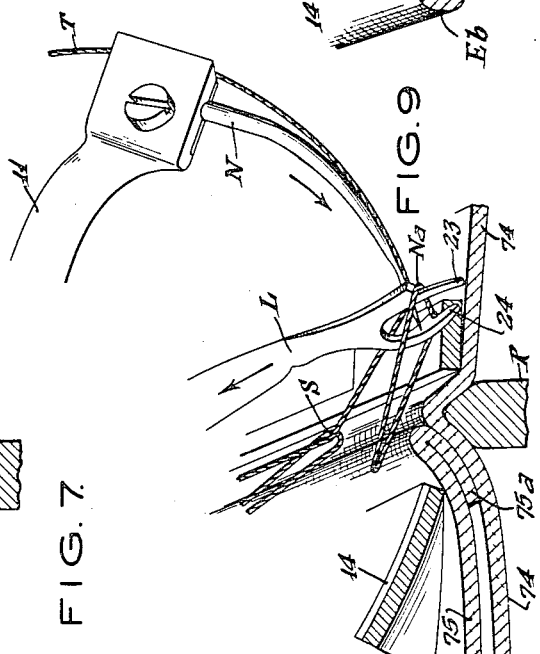
INVENTOR
MARIO BUONO
BY *Mock + Blum*
ATTORNEYS

INVENTOR
MARIO BUONO

United States Patent Office 2,751,870
Patented June 26, 1956

2,751,870
METHOD OF MAKING FELLING STITCHES

Mario Buono, Fort Washington, N. Y., assignor to U. S. Blind Stitch Machine Corp., New York, N. Y., a corporation of New York Original application August 11, 1953, Serial No. 373,574. Divided and this application April 2, 1954, Serial No. 420,478

5 Claims. (Cl. 112—268)

My invention relates to a new and improved method of making felling stitches.

It is necessary to form felling stitches in many important classes of sewing operations, in which the work consists in whole or in part of a plurality of superposed layers. In such cases, the felling stitches overlap the edge of the top layer and said felling stitches extend through the top layer of the work and through the next adjacent lower layer of the work.

Felling stitches are often used to sew a lining to drapery material, which is usually thicker than the lining.

Blind felling stitches are used extensively, to sew a lining to the sleeve of a garment. In doing this work, a tubular cloth sleeve body is first sewed, and said pre-sewed tubular body is inwardly longitudinally folded or doubled at its front edge, so that it has an inner cylindrical sleeve or inner cylindrical body flap at its front edge. The lining is sewed to the tubular sleeve body, while said sleeve body is temporarily turned inside out, so that said inwardly longitudinal cylindrical sleeve or body flap is then at the outside of the turned sleeve body. The body of the lining is usually doubled at its front edge, so that said lining body has an inner lining flap. This lining flap of the doubled lining is applied to the outer face of the exposed sleeve flap or body flap, so that the common front edge of the two lining layers overlaps the inner edge of the body flap. The lining is sewed to the body flap, but not to the body of the sleeve, by means of felling stitches which overlap the common front doubled edge of the two lining layers. These felling stitches are invisible when the tubular sleeve and its lining are turned back to normal position, because said felling stitches do not penetrate the sleeve body.

For more than fifty years, chain-stitch machines which have a curved needle and a looper and a work table have been extensively used in industry.

These machines are generally shown in many United States Patents, such as the following:

| Number | Date |
|---|---|
| 1,926,644 | Sept. 12, 1933 |
| 1,926,761 | Sept. 12, 1933 |
| 2,108,100 | Feb. 15, 1938 |
| 2,108,101 | Feb. 15, 1938 |
| 2,250,745 | July 29, 1941 |
| 2,355,904 | Aug. 15, 1944 |
| 2,514,837 | July 11, 1950 |
| 2,627,828 | Feb. 10, 1953 |

In general, this type of machine has a work-support or work-plate. This work-support is pivoted to the frame of the machine, so that its top face may be vertically adjusted relative to the lateral path of the oscillating, curved needle. This work-support is provided with work-supporting fingers which are pivoted to said work-support, and the material is slidably supported on said fingers. A feed-dog intermittently feeds the material longitudinally away from the front of the machine. The material is thus fed rearwardly away from an operator who is located in front of the sewing station, towards and through said sewing station.

A rib or other bight-forming memebr is operated to form an upward longitudinal bight or bend in the work, while the longitudinal feed of the work is temporarily stopped, and while the curved needle is temporarily out of the work. As viewed at the front of the sewing station of the machine, the lateral piercing stroke of the laterally oscillated curved needle has been generally counter-clockwise or from left-to-right, and its reverse lateral stroke in which the needle is moved out of said bight, has been clockwise or from right-to-left.

Although this general type of machine, which forms looped chain stitches, has been well-known and extensively used for at least fifty years, it has not been used in doing felling, or such use has been very unsatisfactory, particularly in felling a lining to a sleeve. In general, this type of machine has moved the curved needle laterally from left-to-right as viewed at the front of the sewing station, in the lateral piercing stroke of the oscillating needle. Hence, in sewing a lining to a sleeve, as one example, it was necessary to force the entire tubular sleeve body on the work-support or work plate, with the front doubled edge of the sleeve body at the left of the operator, as viewed at the front of the machine. This was impossible or so difficult, as to make it impossible to use this type of machine for felling a lining to a sleeve, and also for doing many other types of felling work. Hence such felling work has been largely or wholly done by hand.

According to this invention, this well-known method, as embodied in this well-known type of sewing machine has been improved so that it is possible to do felling work by means of looped chain stitches quickly and accurately, with a great saving in cost.

According to one feature of my invention, the curved needle is oscillated laterally in its forward piercing stroke right-to-left and in a rear reverse stroke out of the work from left-to-right, thus reversing the usual direction of the piercing stroke of the needle. Whenever the direction of movement of the needle is specified, this is the direction which is observed at the front of the machine and hence in front of the sewing station.

According to another feature of my invention, the upward longitudinal bight which is transversely U-shaped, is formed only in the lower layer or layers of the work, at the right of the top layer or layers, and the top layer or layers are located upon the left shoulder or wall of the upward longitudinal bight.

Hence, in sewing a lining to a pre-sewed tubular sleeve body, as one example, it is necessary to mount only the doubled edge-portion of the turned sleeve-body on the work-table, so that the doubled front edge of the turned sleeve body is at the right, as viewed at the front of the machine. The main part of the turned sleeve-body and the main part of the lining are off the work support. The longitudinal and transversely U-shaped bight is formed only in the two layers of the turned sleeve body, one of said layers being said temporarily exposed cylindrical flap of the turned and tubular sleeve-body. The two layers of the doubled lining rest upon the left wall or shoulder of the longitudinal bight which is formed only in the two layers of the turned sleeve body. Said bight is formed at the left of the doubled edge of said turned sleeve body. In its lateral right-to-left or clockwise piercing stroke, the curved needle first penetrates the cylindrical flap of the turned sleeve body, and the needle then penetrates the two layers of the lining which are proximate to the doubled edge of the sleeve-body. At the end of said piercing stroke, the looper engages the loop of needle thread and the looper transfers said engaged loop of needle thread from left to right as viewed at the front of the sewing station. For this purpose, the action of the looper has been greatly modified. A series of blind felling chain stitches are thus formed, in which the loops of the needle thread overlap the doubled edge of the lining, and said loops are directed in the direction of feed and to the left of the points at which said felling stitches engage the exposed flap of the tubular sleeve body.

In certain classes of work, these chain felling stitches need not be blind stitches.

It is well-known to connect the layers of the work by temporary basting stitches, which are removed from the finished work and this can be done in doing felling work by the improved method.

The invention is further explained in the following drawings and description. In this specific illustration, the method is embodied in a machine which has a curved oscillating needle, an oscillated longitudinal rib and many other specific features. The invention is not limited to the type of machine which is shown as a highly perferred embodiment.

Fig. 2 is taken at the left of Fig. 1.

Figure 5:
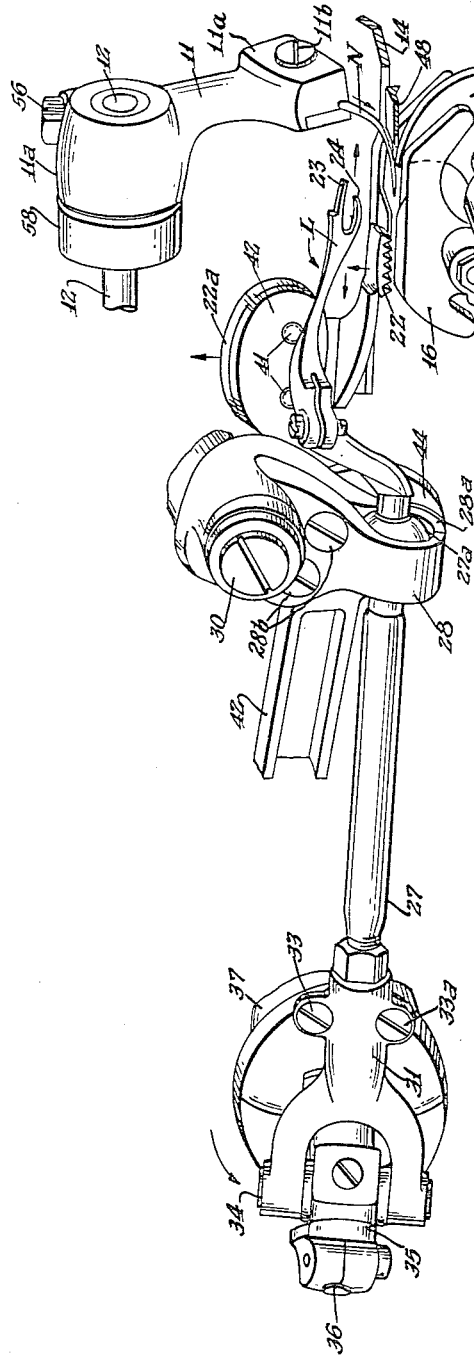

Fig. 5 is a detail perspective view of some of the parts of the machine. The view corresponds to Fig. 10. The needle is at the end of its clockwise or right-to-left piercing stroke. The looper is in its extreme rearward position, and as viewed at the front of the machine, the looper is at the right of the rib.

Figure 6:
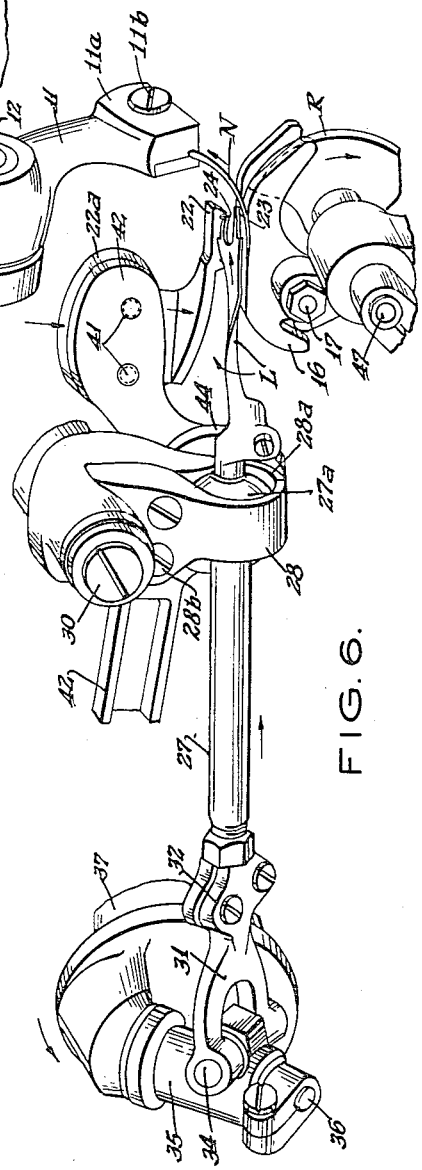

Fig. 6 shows the parts of Fig. 5, in the positions of Fig. 8. The needle has commenced its reverse counter-clockwise or left-to-right stroke out of the work.

Fig. 7 is a detail front view, showing the bight-forming rib in vertical section. The needle is shown at the end of its clockwise or right-to-left piercing stroke, in which it has pierced three layers of the work. The looper is shown anterior its position in which it engages the loop of needle thread.

Fig. 8 is similar to Fig. 7. Fig. 8 shows the needle shortly after the beginning of its reverse left-to-right stroke and prior to the end of said reverse stroke. The looper is shown with its long finger in the respective loop of needle thread.

Fig. 9 is similar to Figs. 7 and 8. Fig. 9 shows the needle at the end of its reverse counterclockwise left-to-right lateral stroke. It also shows how the looper has shifted the next-preceding loop of needle thread, so that the needle can pass through said next-preceding loop of needle thread, in the next right-to-left or clockwise piercing stroke of the needle.

Fig. 10 shows the needle at the end of the next right-to-left or clockwise piercing stroke, in which the needle passes through the next-preceding loop of needle thread, in order to form the respective chain stitch.

Figure 2:
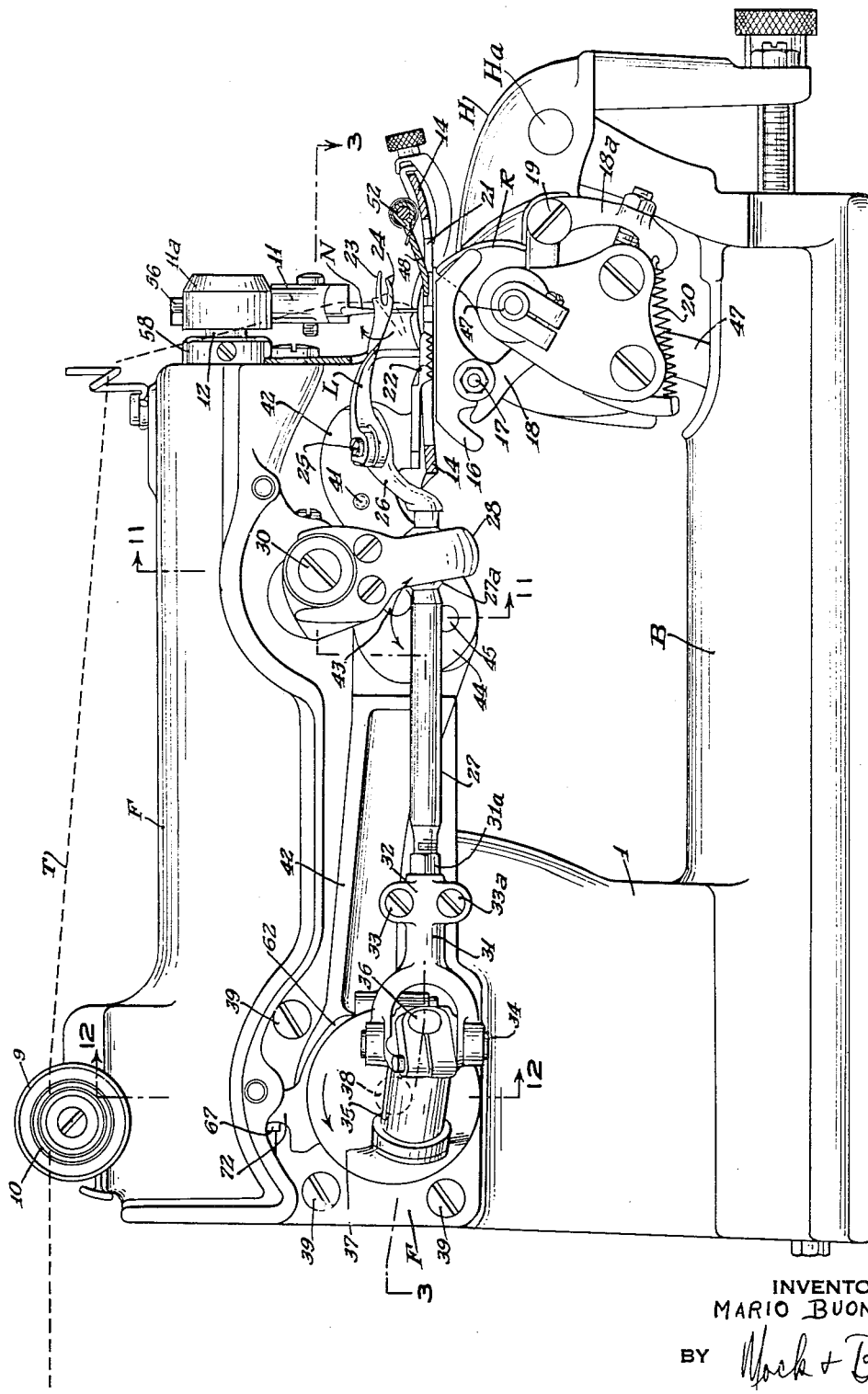
Fig. 2 is an end elevation of Fig. 1.
Figure 11:
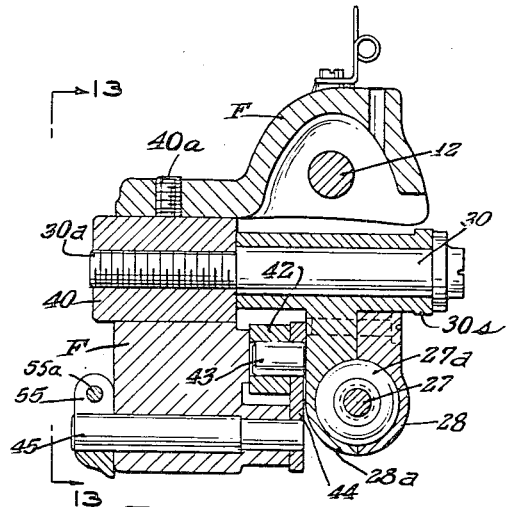

Fig. 11 is a longitudinal vertical section on the line 11—11 of Fig. 2.

Figure 12:
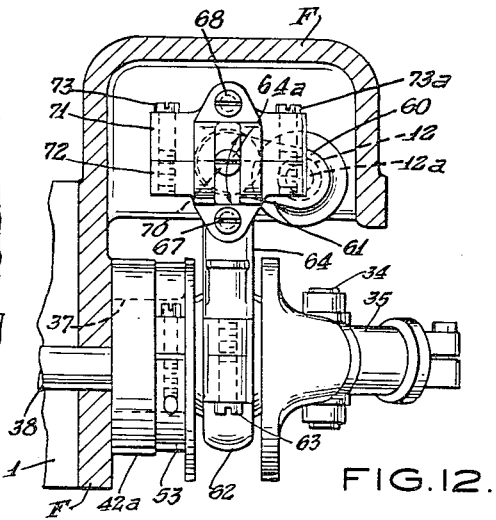

Fig. 12 is a longitudinal vertical section on the line 12—12 of Fig. 2.

Figure 13:
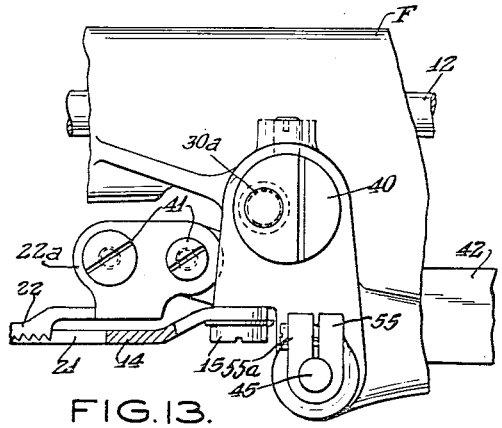

Fig. 13 is an elevation partially in section, on the line 13—13 of Fig. 11.

Figure 14:
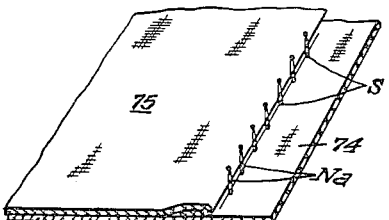

Fig. 14 is a perspective view, partially in longitudinal and lateral vertical cross-section, which shows the visible parts of the chain stitches which are also in the concealed portion of the work, when the work is done according to the improved method.

Figure 15:
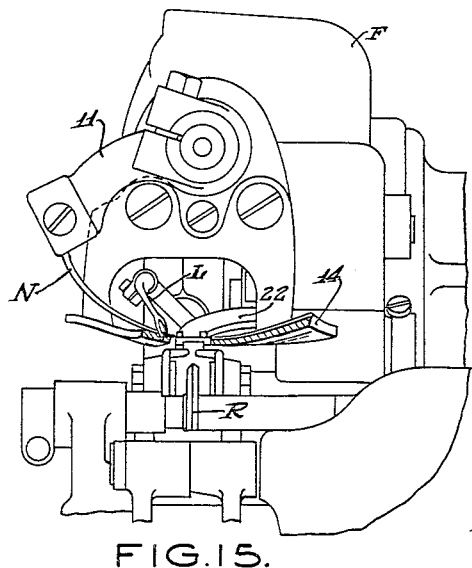

Fig. 15 is an end-view, partially in lateral vertical cross-section, which generally shows the old-style machine, in which the lateral piercing stroke of the needle is from counterclockwise or left-to-right.

Figure 16:
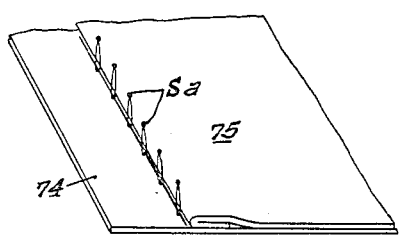

Fig. 16 is a perspective view which shows the location of the visible parts of the chain stitches which are formed by the old-style method and machine.

Fig. 17 shows how a lining is sewed to the tubular turned cloth body of a sleeve by felling stitches.

Figure 3:
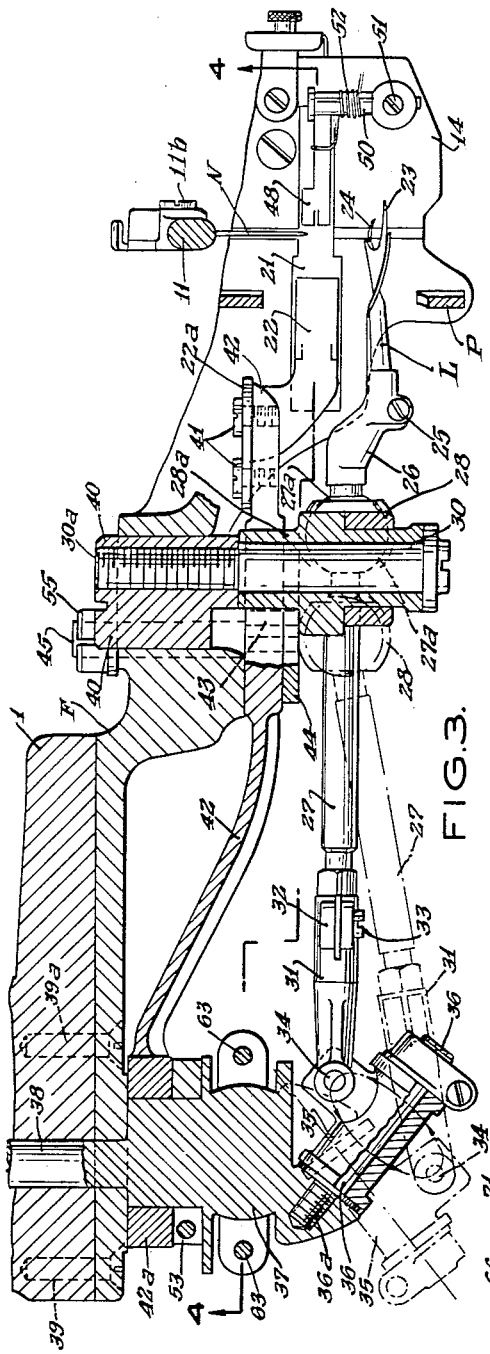
Fig. 3 is a horizontal section on the line 3—3 of Fig. 2. It shows respective extreme position of the mechanism for operating the looper, in full lines and in broken lines.

The machine has an arm or head 1, a frame F, a work-support H, and a base B. As shown in Fig. 3, the arm or head 1 is fixed detachably to frame F by releasable fastening members 39 and 39a.

Figure 1:
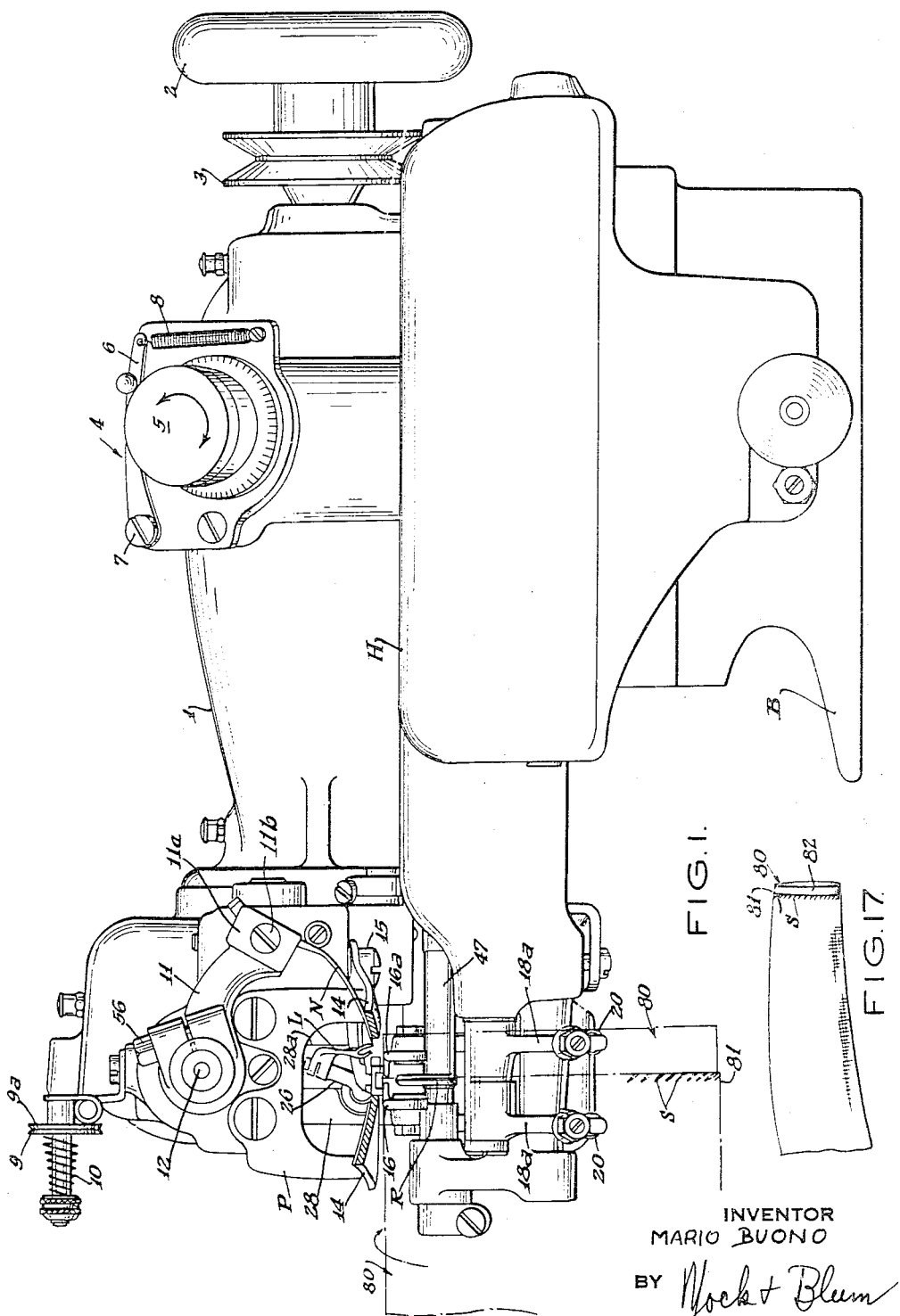
Fig. 1 is a front elevation of the machine, whose operation results in the improved method. The needle is shown at the beginning of its clockwise piercing stroke.

Fig. 3 shows the main shaft 38 of the machine, which is parallel to the lateral plane which is shown in Fig. 1. Fig. 1 shows the usual hand-wheel 2 and the usual drive-pulley 3, which are fixed to said main shaft 38.

It is well-known to regulate the vertical position of the work-table or work-support H, relative to the lateral path of the needle, in order to regulate the depth of the stitch, so that this detail does not require any detailed description. As shown in Fig. 2, the work-support H is pivoted at Ha to the frame of the machine. The angular position of work-support H is adjusted by known adjusting means, which are described in said prior patents. The hand-operated means 4, for operating said adjusting means, are shown in Fig. 1. Said means 4 include a turnable knob 5, which is turned manually, in order to regulate the position of work-support H and the depth of the stitch. Said knob 5 has teeth, not shown. Additional teeth, not shown, are provided in lever 6 which is pivoted at 7 to arm 1. A tension spring 8 keeps these teeth of knob 5 and lever 6 in mesh, so that lever 6 keeps knob 5 in its adjusted position, although knob 5 can be turned by hand while said teeth are in mesh.

Fig. 1 and Fig. 2 show the usual discs 9 and 9a, between which the needle thread 1 is led over the usual guide to the curved needle N. These discs 9 and 9a keep thread 1 under tension anterior needle N. Disc 9a is fixed to arm 1. Disc 9a is laterally slidable relative to disc 9. A compression spring 10 urges slidable disc 9a towards disc 9, which may be turnable or nonturnable. This detail is well-known and does not require further illustration.

The upper end of the curved needle N is releasably fixed by clamping member 11b and screw 11c to the lower end of needle arm 11.

As shown in Fig. 1, the upper end of needle-arm 11 is fixed to one leg of a resilient clamping yoke 11a, whose legs are clamped by screw 56 to the usual longitudinal needle shaft 12. This needle shaft 12 is rocked or oscillated, in order to oscillate the curved needle N, by means which are later described.

Fig. 1 also shows the usual needle-plate 14, which is fixed rigidly to arm 1 by a fastening screw 15.

Fig. 2 shows the usual longitudinal slot 21 of the needle plate 14, in which the feed-dog 22 operates in the usual manner, in intermittent longitudinal feeding strokes, in order to feed the work longitudinally, namely, in the plane of Fig. 2. The bight is formed intermittently in the work by the usual rib R, which is moved intermittently upwardly through the slot 21, in order to form the bight which is shown in Figs. 7–10 inclusive. Of course, the needle N is oscillated in its piercing stroke and in its reverse stroke while the longitudinal feed of the work is temporarily discontinued. The means for operating the rib R are not shown, because they are well-known and described in said prior patents.

The work is fed under the needle-plate 14 in the usual manner and it remains under the needle-plate 14 in the usual manner, save when the rib R is operated to form the transversely upward and longitudinal bend or bight in the work.

In Figs. 7–10, the invention is illustrated in an example in which the work consists of a single layer of fabric 74, which is folded from left-to-right at the fold line Eb, to provide an upper left-to-right layer 75, which has an inwardly folded right-to-left layer 75a at the fold line E.

Said layer 75a is intermediate the layers 75 and 74. If the work is a turned sleeve-body which has a flap which is then at the outside of the sleeve-body, the folded edge of the sleeve body is at the right as viewed at the front of the sewing station, the longitudinal and transversely upward U-shaped bight is formed by rib R at the left of said folded edge and at the right of the left edge of said flap, and both layers of the lining are on the upwardly bent left wall or left leg of the longitudinal bight which is formed by rib R, and said bight is formed only in the layers of the turned sleeve-body. This is indicated in Fig. 1.

Hence the sleeve body is then off the work plate 14, save for the small part of the folded part of the sleeve-body which has the flap.

In Figs. 7–10, if the work is viewed at an observation station which is at the front of the machine, and hence at the front of the sewing station, it is clear that the work has a thinner section at the right than at the left. The fold line E is designated as the junction line between the relatively thick left section and the relatively thin right section. As viewed at said observation station, each sewing stroke is from right-to-left, and the needle thread is forced in each sewing stroke successively through the work at the right of said junction line E, and then through the work on the left leg of the bight. The peak of the bight is at the right of the junction line E, as thus viewed.

Fig. 7 shows the curved needle N at the end of its right-to-left lateral piercing stroke, in which the needle N first passes through the right wall of the bight, then through the left wall of the bight, and then through the two layers 75 and 75a, at the left of the doubled edge E. The needle N penetrates the two walls of the bight close to the top or peak of said bight, and it penetrates the layers 75 and 75a close to their doubled edge E. As previously explained, if blind felling stitches are used to sew a lining to a sleeve, the needle penetrates only the exposed right-to-left turned flap of the sleeve-body and does not penetrate the sleeve-body itself. However, the needle may penetrate both the flap and the sleeve-body. Fig. 7 shows the formation of a blind felling stitch, in which the needle penetrates the layer 74 between its top and bottom faces, so that the felling stitches will not be visible at the exposed face of the layer 74. However, if layer 74 is thin, exposed felling stitches will be formed, instead of blind felling stitches, and the invention is not limited to the formation of blind felling stitches.

It is clear from Fig. 7 that the main portions of layers 75 and 74, which are at the left of the bight, are off the work table, and that only the right edge-portion, which has the thickest part of the work, need be on the work table.

Fig. 7 shows the position of the looper L at the left of the bight, at the end of the lateral right-to-left piercing stroke of the needle N.

Fig. 8 shows the position of the needle N, shortly after the beginning of its reverse lateral left-to-right stroke. A loop Na of the needle thread has been formed in the usual manner. The finger 23 of the looper L has entered said loop Na. The arrows in Figs. 7 and 8 indicate the respective direction of the respective lateral strokes of the needle N.

Fig. 9 shows the needle N at the end of its left-to-right reverse stroke. The arrow in Fig. 9 indicates the direction of the next right-to-left lateral stroke of the needle. Fig. 9 shows how both fingers 23 and 24 of looper L have entered and enlarged the loop Na during the left-to-right reverse stroke of the needle, and that the looper L has shifted said enlarged loop to the right of the bight which has been formed only in layer 74, and that said enlarged loop Na has been shifted longitudinally forwardly, so that the needle N will enter said enlarged and longitudinally shifted loop Na in the next lateral right-to-left piercing stroke of the needle, before the needle will penetrate the bight in layer 74.

Fig. 10 shows the needle Na at the end of its next right-to-left piercing stroke, or close to the end of said piercing stroke. As shown in Fig. 10, the needle N has passed successively through the enlarged loop Na, through both walls of the bight in layer 74, and through both layers 75 and 75a, and the looper L has been moved out of the loop Na, shortly after the needle N has passed between the loop fingers 23 and 24 to enter the loop Na.

A succession of felling chain-stitches S is thus formed.

Fig. 14 shows the felling chain-stitches S in the finished work. The work is held in Fig. 14 in the same position that it had during the sewing. The chain-stitches S are at the right edge of the thicker part of the work, which has the greatest number of layers.

Fig. 16 shows the finished work in the position in which it must be held in forming felling stitches Sa, in the old style chain-stitch machine. These stitches Sa are at the left edge of the thicker part of the work.

If the layers 75 and 74 are of considerable lateral dimensions, it is impossible to put them on the work table or work-support H at the right of the bight. In the improved machine, only a short lateral part of the work need be put on the work-table or work-support H.

Fig. 17 shows a lining 81 sewed by felling stitches S to the exposed inturned flap 82 of a sleeve 80. This sleeve 80 is shown in the position in which the felling stitches S are formed according to the improved method. Only the right edge-portion of the sleeve 80 and of its lining 81 need be located on the work-table. In this example, in each right-to-left piercing stroke, the needle first penetrates the two walls of the upward longitudinal bight which is formed by rib R in flap 82 and in the corresponding adjacent part of the body of sleeve 80, without penetrating the bight which is simultaneously formed in the body of the sleeve 80. The left edge of flap 82 is not shown in Fig. 17, because it is under the right doubled edge portion of the lining 81.

Fig. 1 shows the usual identical work-supporting fingers 16 and 16a, on which the work is directly slidably supported below the needle-plate 14. These fingers 16 and 16a are pivotally connected to the usual and identical associated parts, which include the usual arms or levers 18, which have the usual extensions 18a.

Thus, Fig. 2 shows that the finger 16 is pivoted at 17 to an arm or lever 18, which is pivoted at 19 to the work-table or work-support H. Said arm or lever 18 has the usual extension 18a. A tension biasing spring 20 which is connected to work-support H and extension 18a, biases arm 18 to bias finger 16 upwardly, in the usual manner.

As shown in Fig. 5, the looper L has the usual long looper finger 23 and the usual short looper finger 24.

As shown in Figs. 2 and 3, one end of the looper L is fixed by a fastening member 25, to an angular extension 26 of a looper-rod 27, which has an integral ball 27a. A shown in Fig. 11, this ball 27a of the looper-rod 27 of looper L fits turnably in a ball-shaped recess of a yoke which consists of the yoke-members 28 and 28a, which are fixed detachably to each other by fastening members 28b. As shown in Fig. 11, the yoke member 28a has a sleeve 30s, which has a cylindrical bore. This sleeve 30s is turnable on a cylindrical pivot-stud 30 so that the yoke 28—28 is turnable in 30. This pivot-stud 30 has a threaded co-axial extension 30a, which is screwed into a threaded recess of a bushing 40, which has a cylindrical outer wall which is turnable in a cylindrical bearing socket of frame F. Said pivot-stud 30 and its threaded extension 30a have a common pivot axis, which is eccentric relative to the axis of the outer cylindrical wall of bushing 40. Hence, by turning bushing 40 manually in its cylindrical bearing socket of frame F to a selected adjusted position, the effective longitudinal stroke of looper L can be adjusted, in order to regulate the length of the chain stitch. The bushing 40 is held in its manually adjusted position by the releasable clamping screw 40a.

The ball 27a and said sleeve 30s and said pivot-stud 30 provide the usual universal joint connection between the looper-rod 27 and said pivoted yoke 28a—28.

As shown in Fig. 2, the inner or left end of the looper-rod 27 is located in a socket 31a of a looper-actuating member 31. This socket 31a of looper-actuating member 31 may be split, resilient, and internally threaded. The inner or left end of looper rod 27 may be threaded and screwed into said socket 31a.

This split and resilient socket 31a of looper-actuating member 31 may be tightened by a clamp which consists of two clamp parts 32, which are forced towards each other by clamping screws 33 and 33a.

As shown in Fig. 2 and Fig. 3, the inner end of the looper-operating member 31 is fork-shaped to provide two legs which are pivoted to a hollow bushing 35 by a pivot-pin 34.

This hollow bushing 35 is turnable on an inner stud-shaft 36. As shown in Fig. 3, this stud-shaft 36 has a co-axial threaded end 36a, which is screwed into a threaded recess of an eccentric wheel 37, which is fixed to and which is eccentric relative to shaft 38, which is continuously turned in the same direction while the machine is operating. This eccentric wheel 37 operates the looper and it rocks the needle shaft 12.

The pivot pin 34 is thus shifted back and forth between its respective extreme positions which are shown in full lines and broken lines in Fig. 3, and the looper L is actuated to operate as above described.

The usual feed-dog 22 is operated in the usual four-motion path, in order to intermittently engage and feed the work longitudinally away from the operator towards the rear of the machine.

Figure 4:
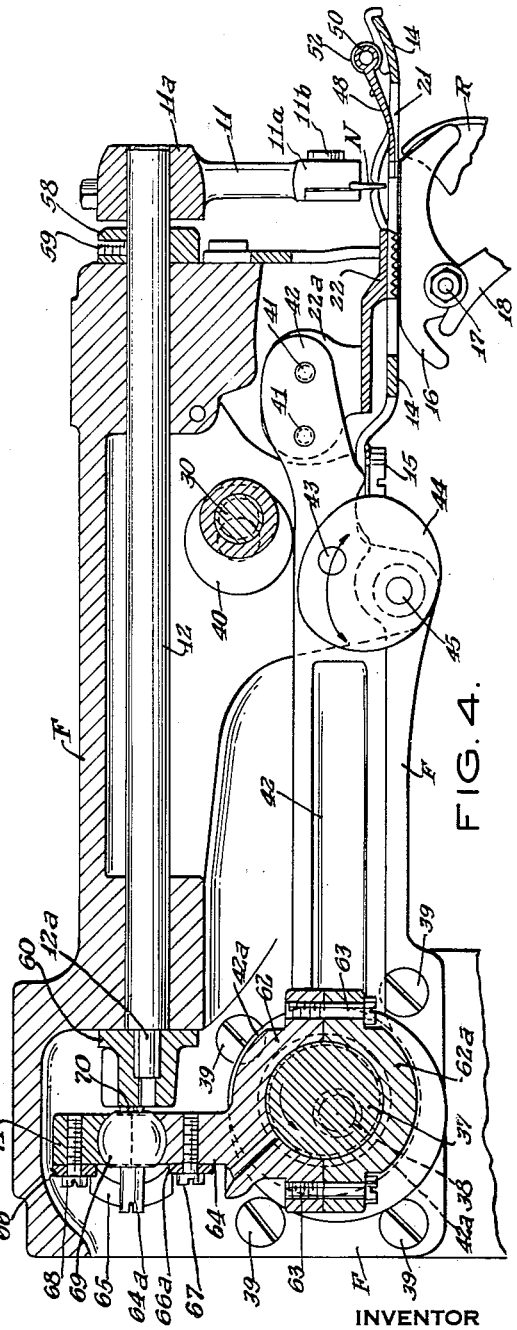
Fig. 4 is a longitudinal vertical section on the line 4—4 of Fig. 3.

As shown in Fig. 4, the feed-dog 22 has an extension 22a, which is fixed by screws 41 to one end of a feed-bar 42, which has an annular hub 42a which fits on a part of the periphery of the eccentric wheel 37. As shown in Fig. 3, a spacing collar 53 is located between said hub 42a and a flange of the eccentric wheel 37. The hub 42a is thus located on the eccentric wheel 37 between said collar 53 and another flange of wheel 37. Said wheel 37 is freely turnable relative to the hub 42a, so that hub 42 operates as an eccentric strap.

As shown in Fig. 4 and Fig. 11, the feed bar 42 has a bore in which a pivot pin 43 is located. As shown in Fig. 4, this pivot pin 43 extends into a disc 44, which is fixed to a pivot pin 45. The pivot pin 45 is turnable in a bearing of the frame F. The disc 44 is oscillated by the eccentric wheel 37 about the central axis of the pivot pin 45, which turns in unison with the disc 44 relative to frame F. As shown in Fig. 11 and Fig. 13, the pivot pin 45 is provided with a split head 55, whose parts are held together by a releasable fastening member 55a. The enlarged head 55 prevents the longitudinal shifting of pivot 45 to the right as viewed in Fig. 11. The disc 44 is oscillated during the reciprocating movement of the bar 42, around the axis of pivot 45, in order to raise and lower the feed-dog 22 in timed relation to its longitudinal rearward feeding stroke and its return idle and upper longitudinal stroke. The pin 45 may be fixed to frame F and disc 44 may be turnable on pin 45.

Fig. 1, Fig. 2 and Fig. 4 show the usual rib R, which is oscillated in the usual manner, in order intermittently to form the upward longitudinal bight or bend of the work in the front part of the longitudinal slot 21 of needle plate 14. This rib R is fixed to the rib-shaft 47, which is oscillated in the usual manner. The mechanism for oscillating the shaft 47 of rib R is located in the hollow base B of the machine and is of the usual type, so that it is not shown.

Fig. 4 shows the usual top pressure finger 48, which presses downwardly against the top of the bight of the work which is formed in the slot 21, in order to cooperate with the rib R in forming the bight. As shown in Fig. 3 and Fig. 4, this pressure finger 48 is turnably connected to a lateral pin 50, which is fixed by a screw 51 to the needle plate 14. A torsion spring 52 is located around the pin 50. One end of this torsion spring 52 abuts the pressure finger 48 in order to urge it to turn downwardly.

As shown in Fig. 4, a collar 58 is releasably fixed to the needle rock-shaft 12 by a clamping screw 59, in order to prevent sliding movement of the needle shaft 12 in its bearing in the frame F to the right, as viewed in Fig. 4. As also shown in Fig. 4, the rock-shaft 12 is provided with a reduced left end 12a. As shown in Fig. 4 and Fig. 12, a hub 60 is provided at one end of a lever or arm 61. This hub 60 is clamped or otherwise releasably fixed to the reduced end 12a of the needle-shaft 12. This arm or lever 61 is oscillated, in order to oscillate the needle-shaft 12.

Fig. 3 and Fig. 4 shows another eccentric strap or hub which consists of two parts 62 and 62a, which are held to each other by screws 63. This strap is mounted on eccentric wheel 37. This strap 62—62a is used to oscillate the arm or lever 61 and hence to oscillate the needle-shaft 12 by means of intermediate parts. The wheel 37 rotates freely relative to this strap 62—62a. As shown in Fig. 3, these parts 62 and 62a of said hub or strap have inner concave walls which interfit with a convex part of the periphery of eccentric wheel 37, so that said strap or hub 62—62a cannot shift relative to eccentric wheel 37 in a direction parallel to its actuating shaft 38.

Fig. 12 shows bearing members 71 and 72, are connected to each other by screws 73 and 73a. Figs. 4 and 12 show a member 69, a part of which has a ball-shape and which is provided with opposed flat walls. Said assembled bearing members 71 and 72 have a concave socket, in which the ball-shaped part of the member 69 fits turnably. Said member 69 has a pin 70 which is parallel to shaft 12 and which is fixed to the arm or lever 61.

As shown in Fig. 4, the hub-member or strap-member 62 has an extension arm 64. As also shown in Fig. 4, one end of an arm 65 has an end-lug 66 which is fixed releasably to said extension arm 64 by a screw 67. The other end of said arm 65 has an end-lug 66 which is fixed releasably to bearing 71 by a screw 68.

Hence, when the eccentric wheel 37 is turned relative to its strap or hub 62—62a, the member 69, which can turn freely relative to bearings 71 and 72, oscillates the lever 61, whose hub 60 is fixed to extension 12a of shaft 12, thus oscillating said shaft 12 and oscillating the needle N.

Fig. 15 diagrammatically shows the old-style chain-stitch machine. The needle N is shown in Fig. 15 at the beginning of its left-to-right piercing stroke.

The needle-plate 14 is held fixed by the usual plate P.

The member 64a which is shown in Fig. 4 is an optional member which extends through a bore of arm 65 and which abuts the adjacent flat face of the member 69.

In the example of Fig. 17, the work consists of two pieces of fabric, namely, the sleeve 80 and lining 81, which are sewed to each other by the felling stitches S.

Hence the work may consist of a single piece of fabric, or a plurality of pieces of fabric.

In each example, the work has an edge over which the felling stitches are formed. In the example of Figs. 7–10, this edge is the edge E. In the example of Fig. 17, this edge is the right edge of the lining 81. For convenience, this edge is designated as the felling edge.

In each example, the work has a bright forming portion in which a transverse bight is formed. In the example of Figs. 7–10, this bight-forming portion is intermediate the felling edge E and the edge Eb. This bight forming portion is of sufficiently small width to pass over the work-table or to pass through the feeding space of the machine.

The other lateral portion of the work, which is between the edges Eb and E in the example of Figs. 7–10, usually has a width or lateral dimension which is much greater than the width of the work table H or the width of the feeding space of the machine. For convenience, this other lateral portion is designated as the second lateral portion of the work.

For convenience, the direction of feed of the work is designated as the longitudinal direction.

In the example of Figs. 7–10, a bight is formed which has two walls; each said wall has a base or bottom and said bight-walls meet in a common peak or top. This applies to the example of Fig. 17.

In each example, the felling edge is spaced laterally from the base of at least one of said bight-walls.

Thus, in the example of Figs. 7–10, the felling edge E is spaced laterally to the left of the right bight wall. For convenience, this right bight wall is designated as the remote bight wall.

In each example, the sewing thread is passed laterally through the work in a single lateral sewing stroke, first through the bight and then through another part of the work at a selected second point of the work. This selected second point is located laterally inwardly of the felling edge, in the direction of said lateral sewing stroke.

When I refer to passing the sewing thread through the bight, the said sewing thread may be passed only through the thickness of the fabric at the peak of the bight, or said sewing thread may be passed through one or both bight walls below said peak. Thus, in the example of Fig. 17, if the cloth of the sleeve is thin, the sewing thread may be passed through both bight walls of the sleeve flap, below the peak of the bight.

In each example, after said lateral sewing stroke has been performed, a loop of the thread is formed, and said loop is shifted laterally over the felling edge in a lateral direction reverse to said lateral sewing stroke, to an enchaining point, at which the next portion of the sewing thread is enchained with said loop. Said felling edge is laterally intermediate said selected second point and said enchaining point.

The second lateral portion of the work is usually thicker or has more layers than the bight forming portion of the work. Also, the second lateral portion of the work is usually wider than the bight forming portion. However, these factors may be varied or omitted in the border aspect of the invention.

As viewed in Fig. 1, the work-supporting fingers 16 and 16a and the rib R are at the left edge of the machine, and the part of the work at which the bight is formed and in which the felling operation is performed, is moved into position from left to right, with the wide part of the work depending at this left edge of the machine. This left edge is designated as the outer edge or free edge of the machine. Fig. 1 shows the needle N at the end of its reverse stroke, which corresponds to the position of Fig. 9.

Hence, in the improved method, when the needle is actuated in its forward piercing stroke, the needle is first moved over the bight forming means, towards the free edge of the machine. In distinction, and as shown in Fig. 15, when the needle is moved in the old piercing stroke, from right to left, the needle first moves over the free edge of the machine towards the bight forming means.

The drawings are substantially to scale, with different scales in the respective drawings, and reference is made thereto for additional disclosure.

The looper rod 27 is tilted relative to its mount 28—28a, which turns around a lateral axis. The looper rod 27 is also turned around its axis, relative to its mount 28—28a.

Thus, when the hollow bushing 35 and its offset pivot 34 are in the full-line position of Fig. 3, the looper-rod 27 is also in its full-line position of Fig. 3, and the looper L is in its extreme forward position of Fig. 9, and the needle N is at the end of its reverse left-to-right stroke which is shown in Fig. 9. Fig. 9 also shows, in broken lines, the position of the hollow bushing 35 and of the looper-rod 27, when the eccentric 37 is turned 180° from its position of Fig. 3.

The pivot 34 is in its extreme forward position, in its full-line position at Fig. 3. At this time, and as shown in Fig. 4, the feed-dog 22 is in its extreme forward position and it is ready to begin its longitudinal rearward feeding stroke. Hence the work is fed while the needle is out of the goods.

This is a divisional application of application Serial No. 373,574, filed August 11, 1953.

I claim:

1. A method of sewing a lining to a tubular sleeve, said sleeve having a longitudinal axis, said sleeve having a body which has a fold-edge at one end thereof, said body being integral at said fold-edge with an external flap, said external flap extending longitudinally inwardly from said fold-edge towards the other edge of said sleeve to overlie the respective adjacent part of said body, which consists in locating said adjacent part of said body and said flap on a work-support while keeping the major part of said body off said work-support, intermittently turning said supported body in successive feeding strokes in a feeding direction which is transverse to said longitudinal axis to feed the top of said respective adjacent part and the top of said flap towards a sewing station, forming an upwardly directed U-shaped bight which has two legs and a peak in said top of said adjacent part and also in said top of said flap, the line of said peak being formed in said feeding direction, said fold-edge being kept at the right end of said sleeve as viewed at an observation station which is located in front of said sewing station, said bight being formed intermediate said fold-edge and the other edge of said flap, applying the lining to the leg of said bight which is the left leg thereof as viewed at said observation station, and forming chain stitches at said sewing station which sew said lining to said left leg, said chain stitches being formed during the intervals between successive feeding strokes, said chain stitches being formed at said sewing station by needle thread which is forced through said flap and said lining in right-to-left sewing strokes as viewed at said observation station, said needle thread being successively engaged in each sewing stroke with the right leg of said bight and with said left leg and said lining as viewed at said observation station, the sewing thread being enchained to form chain stitches at the right of said peak as viewed at said observation station.

2. A method according to claim 1, in which the lining is kept at the left of said left leg, as viewed at said observation station.

3. A method according to claim 1, in which blind stitches are formed in said respective adjacent part.

4. A method of forming chain felling stitches in work which has adjacent sections which have a junction line, one section having more layers at its side of said junction line than the other section, the first-mentioned section being relatively thick and the second-mentioned section being relatively thin, which consists in supporting said thin section on a support, also supporting only a part of said thick section at said junction line on said support while keeping the major part of said thick section off said support, feeding said sections while thus supported in intermittent and successive feeding strokes towards a sewing station in a feeding direction which is substantially parallel to said junction line, said relatively thin section being maintained at the right of said relatively thick section as viewed from an observation station which is located in front of said sewing station, forming a U-shaped bight in said work at said sewing station, said bight having a peak substantially in said feeding direction and having two legs which are respectively a left leg and a right leg as viewed at said observation station, the peak of said bight being formed at the right of said junction line as viewed at said observation station, the work having greater thickness at said left leg than at said right leg, and forming chain stitches at said sewing station during the intervals between said feeding strokes, said chain stitches being formed at said sewing station by needle thread which is forced through the work in right-to-left sewing strokes as viewed at said observation station, said needle thread being forced in each sewing stroke successively through the bight of the work at the right of said junction line and through the work of said left leg, the sewing thread being enchained to form said chain stitches at the right of said peak as viewed at said observation station.

5. A method of forming chain stitches in work which has adjacent sections which have a junction line, said work having a longitudinal axis which is perpendicular to said junction line, one of said sections being longer in the direction of said longitudinal axis than the other section to provide a long section and a short section, which consists in supporting said short section on a support, also supporting only a part of said long section at said junction line on said support while keeping the major part of the length of said long section off said support, feeding said sections while thus supported in intermittent feeding strokes towards a sewing station in a feeding direction which is substantially parallel to said junction line, said short section being maintained at the right of said long section as viewed from an observation station which is located in front of said sewing station, forming a U-shaped bight in said work at said sewing station, said bight having a peak substantially in said feeding direction and having two legs which are respectively a right leg and a left leg as viewed at said observation station, the peak of said bight being formed at the right of said junction line as viewed at said observation station, and forming chain stitches at said sewing station during the intervals between said feeding strokes, said chain stitches being formed at said sewing station by needle thread which is forced through the work in right-to-left sewing strokes as viewed at said observation station, said needle thread being forced in each sewing stroke successively through the bight of the work at the right of said junction line and through the work of said left leg, the sewing thread being enchained to form said chain stitches at the right of said peak as viewed at said observation station.

References Cited in the file of this patent
UNITED STATES PATENTS

| | | |
|---|---|---|
| 937,275 | Arbetter | Oct. 19, 1909 |
| 1,132,964 | Onderdonk | Mar. 23, 1915 |
| 2,250,573 | Dearborn | July 29, 1941 |
| 2,514,837 | Buono | July 11, 1950 |